US012064996B2

(12) United States Patent
Nourry et al.

(10) Patent No.: US 12,064,996 B2
(45) Date of Patent: Aug. 20, 2024

(54) RUBBER COMPOSITION FOR A TIRE TREAD

(71) Applicant: COMPAGNIE GENERALE DES ETABLISSEMENTS MICHELIN, Clermont-Ferrand (FR)

(72) Inventors: Christine Nourry, Clermont-Ferrand (FR); Floriandre Voisin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 314 days.

(21) Appl. No.: 17/625,409

(22) PCT Filed: Jul. 6, 2020

(86) PCT No.: PCT/FR2020/051191
§ 371 (c)(1),
(2) Date: Jan. 7, 2022

(87) PCT Pub. No.: WO2021/005295
PCT Pub. Date: Jan. 14, 2021

(65) Prior Publication Data
US 2022/0314696 A1    Oct. 6, 2022

(30) Foreign Application Priority Data
Jul. 9, 2019 (FR) ...................................... 1907674

(51) Int. Cl.
| B60C 1/00 | (2006.01) |
| C08C 19/22 | (2006.01) |
| C08C 19/25 | (2006.01) |
| C08F 136/08 | (2006.01) |
| C08K 3/04 | (2006.01) |
| C08L 9/06 | (2006.01) |

(52) U.S. Cl.
CPC ............ B60C 1/0016 (2013.01); C08C 19/22 (2013.01); C08C 19/25 (2013.01); C08F 136/08 (2013.01); C08K 3/04 (2013.01); C08L 9/06 (2013.01); C08L 2205/03 (2013.01)

(58) Field of Classification Search
CPC .... B60C 1/00; C08L 9/06; C08K 3/04; C08C 19/22; C08C 19/25; C08F 136/08
USPC ......................................................... 523/156
See application file for complete search history.

(56) References Cited

U.S. PATENT DOCUMENTS

| 5,227,425 A | 7/1993 | Rauline |
| 5,852,099 A | 12/1998 | Vanel |
| 5,900,449 A | 5/1999 | Custodero et al. |
| 6,420,488 B1 | 7/2002 | Penot |
| 6,536,492 B2 | 3/2003 | Vasseur |
| 7,056,998 B2 | 6/2006 | Laubry et al. |
| 7,199,175 B2 | 4/2007 | Vasseur |
| 7,250,463 B2 | 7/2007 | Durel et al. |
| 7,335,692 B2 | 2/2008 | Vasseur et al. |
| 7,820,771 B2 | 10/2010 | Lapra et al. |
| 7,900,667 B2 | 3/2011 | Vasseur |
| 8,461,269 B2 | 6/2013 | Varagniat et al. |
| 8,883,929 B2 | 11/2014 | Gandon-Pain et al. |
| 10,676,542 B2 | 6/2020 | Dire et al. |
| 2001/0034389 A1 | 10/2001 | Vasseur |
| 2003/0212185 A1 | 11/2003 | Vasseur |
| 2004/0127617 A1 | 7/2004 | Vasseur et al. |
| 2005/0004297 A1 | 1/2005 | Durel et al. |
| 2005/0130835 A1 | 6/2005 | Laubry et al. |
| 2007/0112120 A1 | 5/2007 | Vasseur |
| 2008/0132644 A1 | 6/2008 | Lapra et al. |
| 2009/0270558 A1 | 10/2009 | Gandon-pain et al. |
| 2010/0022714 A1 | 1/2010 | Varagniat et al. |
| 2011/0021702 A1 | 1/2011 | Gandon-Pain et al. |
| 2011/0190416 A1 | 8/2011 | Maesaka et al. |
| 2012/0208948 A1 | 8/2012 | Gandon-Pain et al. |
| 2013/0267640 A1 | 10/2013 | Lopez et al. |
| 2013/0274404 A1* | 10/2013 | Vasseur .................... C08K 3/36 524/526 |
| 2014/0100321 A1 | 4/2014 | Maejima et al. |
| 2019/0077887 A1 | 3/2019 | Dire et al. |

(Continued)

FOREIGN PATENT DOCUMENTS

| CN | 113039074 A | 6/2021 |
| EA | 019813 B1 | 6/2014 |
| EP | 0501227 A1 | 9/1992 |

(Continued)

OTHER PUBLICATIONS

International Search Report dated Aug. 26, 2020, in corresponding PCT/FR2020/051191 (5 pages).

(Continued)

*Primary Examiner* — Deve V Hall
(74) *Attorney, Agent, or Firm* — VENABLE LLP

(57) ABSTRACT

A tire exhibits an improved performance compromise, the tread of which comprises a rubber composition based on an elastomeric matrix comprising from 25 to 95 parts by weight per hundred parts by weight of elastomer, phr, of copolymer based on butadiene and on styrene having a glass transition temperature of less than −70° C., and from 5 to 75 phr of polybutadiene, the elastomeric matrix comprising less than 15 phr of isoprene elastomer; at least one reinforcing filler; from 25 to 100 phr of at least one plasticizing resin having a glass transition temperature of greater than 20° C.; and a vulcanization system.

16 Claims, No Drawings

(56) References Cited

U.S. PATENT DOCUMENTS

| | | | |
|---|---|---|---|
| 2021/0079200 A1 | 3/2021 | Labrunie | |
| 2021/0130591 A1* | 5/2021 | Fleury | C08C 19/22 |

FOREIGN PATENT DOCUMENTS

| | | | |
|---|---|---|---|
| EP | 0735088 A1 | 10/1996 | |
| EP | 0810258 A1 | 12/1997 | |
| EP | 2266819 A1 | 12/2010 | |
| JP | 60-23406 A | 2/1985 | |
| RU | 2568481 C2 | 5/2015 | |
| TL | 2017/060395 A1 | 4/2017 | |
| WO | 97/36724 A2 | 10/1997 | |
| WO | 99/16600 A1 | 4/1999 | |
| WO | 00/05300 A1 | 2/2000 | |
| WO | 00/5301 A1 | 2/2000 | |
| WO | 02/10269 A2 | 2/2002 | |
| WO | 02/088238 A1 | 11/2002 | |
| WO | 03/016387 A1 | 2/2003 | |
| WO | 03/97708 A1 | 11/2003 | |
| WO | 2006/069792 A1 | 7/2006 | |
| WO | 2006/069793 A1 | 7/2006 | |
| WO | 2008/003434 A1 | 1/2008 | |
| WO | 2008/003435 A1 | 1/2008 | |
| WO | 2012/069565 A1 | 5/2012 | |
| WO | 2017/103386 A1 | 6/2017 | |
| WO | WO-2018115748 A1 * | 6/2018 | B60C 1/0016 |
| WO | 2019/122600 A1 | 6/2019 | |

OTHER PUBLICATIONS

S. Brunauer, et al., "Adsorption of Gases in Multimolecular Layers", J. Am. Chem. Soc., vol. 60, pp. 309-319 (1938).

R. Mildenberg, et al., Hydrocarbon Resins, VCH, New York, chapter 5 (1997).

* cited by examiner

RUBBER COMPOSITION FOR A TIRE TREAD

BACKGROUND

The present invention relates to tyres with a tread, in particular a snow, winter or all-season tread capable of running on ground covered with snow (called "snow tyres", "winter tyres" or "all-season tyres"). As is known, these snow tyres, identified by an inscription M+S or M.S. or else M&S marked on their sidewalls, are characterized by a tread design and a structure which is intended above all to ensure, in mud and fresh snow or slush, behaviour which is better than that of road-type tyres designed for running on non-snow-covered ground.

Snow-covered ground, referred to as white ground, has the feature of exhibiting a low coefficient of friction, which has led to the development of snow tyres comprising treads based on diene rubber compositions having a low glass transition temperature, Tg. However, the grip performance, on wet ground, of these tyres comprising such treads is generally inferior to that of road tyres, the treads of which are generally based on rubber compositions of different formulations, in particular that have a higher Tg. To respond to this problem, application WO 2012/069565 proposes a tread the composition of which comprises a diene elastomer bearing at least one function SiOR, R being a hydrogen atom or a hydrocarbon-based radical, combined with a high content of reinforcing inorganic filler and a specific plasticizing system.

In addition, since fuel economy and the need to protect the environment have become a priority, it is desirable to employ rubber compositions which can be used to manufacture various semi-finished products involved in the formation of tyre casings having reduced rolling resistance. However, the reduction in the rolling resistance often conflicts with the improvement in grip both on wet ground and on snow-covered ground.

In addition, since snow or winter treads are generally provided with more flexible tread patterns and/or composed of a softer rubber composition than "summer" treads, their abrasion resistance often turns out to be lowered as a result. It is also important to preserve as much as possible, or even to improve, the abrasion resistance of snow or winter treads.

Thus, manufacturers are always seeking solutions for further improving a compromise in the properties of rolling resistance, grip on snow-covered ground and the abrasion resistance of tyre treads intended to run in particular on snow-covered ground.

Continuing its research, the applicant has unexpectedly discovered that a specific rubber composition makes it possible to further improve the abovementioned performance compromise.

SUMMARY

Thus, an object of the invention is a tyre, the tread of which comprises a rubber composition based on:
- an elastomeric matrix comprising from 25 to 95 phr of copolymer based on butadiene and on styrene having a glass transition temperature of less than −70° C., and from 5 to 75 phr of polybutadiene, the elastomeric matrix comprising less than 15 phr of isoprene elastomer,
- at least one reinforcing filler,
- from 25 to 100 phr of at least one plasticizing resin having a glass transition temperature of greater than 20° C., and
- a vulcanization system.

In the present document, unless indicated otherwise, the expressions "the composition" or "the composition in accordance with the invention" denote the composition of the tread according to the invention.

I—DEFINITIONS

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the noncrosslinked state.

For the purposes of the present invention, the expression "part by weight per hundred parts by weight of elastomer" (or phr) should be understood as meaning the part by mass per hundred parts by mass of elastomer.

In the present document, unless expressly indicated otherwise, all the percentages (%) indicated are percentages (%) by mass.

Furthermore, any interval of values denoted by the expression "between a and b" represents the range of values extending from more than a to less than b (that is to say, limits a and b excluded), while any interval of values denoted by the expression "from a to b" means the range of values extending from a up to b (that is to say, including the strict limits a and b). In the present document, when an interval of values is described by the expression "from a to b", the interval represented by the expression "between a and b" is also and preferably described.

When reference is made to a "predominant" compound, this is understood to mean, for the purposes of the present invention, that this compound is predominant among the compounds of the same type in the composition, that is to say that it is the one which represents the greatest amount by mass among the compounds of the same type. Thus, for example, a predominant elastomer is the elastomer representing the greatest mass with respect to the total mass of the elastomers in the composition. In the same way, a "predominant" filler is that representing the greatest mass among the fillers of the composition. By way of example, in a system comprising just one elastomer, the latter is predominant for the purposes of the present invention and, in a system comprising two elastomers, the predominant elastomer represents more than half of the mass of the elastomers. Preferably, the term "predominant" is understood to mean present at more than 50%, preferably more than 60%, 70%, 80%, 90%, for example 100%.

The compounds comprising carbon mentioned in the description may be of fossil or biobased origin. In the latter case, they may be partially or completely derived from biomass or may be obtained from renewable starting materials derived from biomass. Polymers, plasticizers, fillers, etc. are notably concerned.

The glass transition temperatures (Tg) of the elastomers are determined by means of a differential calorimeter (differential scanning calorimeter) according to standard ASTM E1356-08 (2014).

II—DESCRIPTION OF THE INVENTION

II-1 Elastomeric Matrix

According to the invention, the elastomeric matrix of the composition of the tread of the tyre comprises from 25 to 95 phr of a copolymer based on butadiene and on styrene having a glass transition temperature of less than −70° C., from 5 to 75 phr of polybutadiene, and less than 15 phr of isoprene elastomer.

Within the meaning of the present invention, "copolymer based on butadiene and on styrene" refers to any copolymer obtained by copolymerization of one or more styrene compounds with one or more butadiene(s). The following are suitable in particular as styrene monomers:

styrene, methyl styrenes, para-(tert-butyl)styrene, methoxystyrenes and chlorostyrenes. 1,3-Butadiene is suitable in particular as butadiene monomer. These elastomers can have any microstructure, which depends on the polymerization conditions used, in particular on the presence or absence of a modifying and/or randomizing agent and on the amounts of modifying and/or randomizing agent employed. The elastomers can, for example, be block, random, sequence or microsequence elastomers.

The copolymer based on butadiene and on styrene is advantageously a butadiene/styrene copolymer (SBR).

It will be noted that the SBR may be prepared in emulsion (ESBR) or in solution (SSBR). Whether it is an ESBR or an SSBR, the SBR may be of any microstructure which is compatible with a glass transition temperature of less than −70° C. In particular, the butadiene/styrene copolymer may have a styrene content of between 1% and 15% by weight and more particularly between 1% and 5%, a content (mol %) of 1,2-bonds of the butadiene part of between 4% and 25%. Advantageously, the copolymer based on butadiene and on styrene is an SSBR.

Advantageously, the copolymer based on butadiene and on styrene has a glass transition temperature within a range extending from −105° C. to −70° C., preferably from −100° C. to −80° C., and preferably between −95° C. and −85° C., more preferably still between −95° C. and −86° C.

Preferably, the copolymer based on butadiene and on styrene is a styrene/butadiene copolymer which exhibits any one, advantageously the combination of two or three, more advantageously still all, of the following characteristics:
- it is a styrene/butadiene copolymer prepared in solution (SSBR),
- its content by mass of styrene, with respect to the total weight of the styrene/butadiene copolymer, is between 1% and 10%, preferably between 1% and 4%,
- its content of vinyl bonds of the butadiene part is between 4% and 25%, preferably between 10% and 15%,
- its Tg is within a range extending from −105° C. to −70° C., preferably between −95° C. and −86° C.

Advantageously the copolymer based on butadiene and on styrene comprises within its structure at least one alkoxysilane group and at least one other function, the silicon atom of the alkoxysilane group being bonded to the elastomer chain or chains, the alkoxysilane group being optionally partially or completely hydrolysed to give silanol.

In the present description, the concept of alkoxysilane group located within the structure of the elastomer is understood as a group the silicon atom of which is located in the backbone of the polymer and directly connected to same. This positioning within the structure includes the polymer chain ends. Thus, the end group is included in this concept. The alkoxysilane group is not a pendant group.

When the alkoxysilane group is located at the chain end, it will then be said that the diene elastomer is functionalized at the chain end.

When the alkoxysilane group is located in the main elastomer chain, it will then be said that the diene elastomer is coupled or else functionalized in the middle of the chain, in contrast to the position "at the chain end", although the group is not located precisely at the middle of the elastomer chain. The silicon atom of this function bonds the two branches of the main chain of the diene elastomer.

When the silicon atom is in the central position, to which at least three elastomer branches are bonded, forming a star-branched structure of the elastomer, it will then be said that the diene elastomer is star-branched. The silicon atom is thus substituted by at least three branches of the diene elastomer.

It should be specified that it is known to those skilled in the art that, when an elastomer is modified by reaction of a functionalization agent with the living elastomer resulting from a step of anionic polymerization, a mixture of modified entities of this elastomer is obtained, the composition of which depends on the modification reaction conditions and especially on the proportion of reactive sites of the functionalization agent relative to the number of living elastomer chains. This mixture may comprise entities which are functionalized at the chain end, coupled, star-branched and/or non-functionalized.

Advantageously, the copolymer based on butadiene and on styrene comprises, as predominant entity, the diene elastomer functionalized in the middle of the chain by an alkoxysilane group bonded to the two branches of the diene elastomer via the silicon atom, the alkoxy radical optionally being partially or completely hydrolysed to give hydroxyl.

More particularly still, the diene elastomer functionalized in the middle of the chain by an alkoxysilane group represents 70% by weight of the copolymer based on butadiene and on styrene.

In the alkoxysilane group the alkoxyl radical, optionally partially or completely hydrolysed to give hydroxyl, the alkoxyl radical may comprise a $C_1$-$C_{10}$, or even $C_1$-$C_8$, preferably $C_1$-$C_4$, alkyl radical, and more preferentially the alkoxyl radical is a methoxy or an ethoxy.

The other function is preferably a function comprising at least one heteroatom selected from N, S, O, P. Among these functions, mention may be made, by way of example, of primary, secondary or tertiary amines, which may be cyclic or noncyclic, of isocyanates, of imines, of cyano, of thiol, of carboxylates, of epoxides, or of primary, secondary or tertiary phosphines.

The copolymer based on butadiene and on styrene advantageously comprises at least one function comprising a nitrogen atom. Thus, the copolymer based on butadiene and on styrene advantageously comprises within its structure at least one alkoxysilane group bonded to the elastomer via the silicon atom, and a function comprising a nitrogen atom.

This function comprising a nitrogen atom may be located at the chain end and be directly connected to the elastomer via a covalent bond or a hydrocarbon-based group.

This function comprising a nitrogen atom may also, and advantageously, be borne by the alkoxysilane group. The function comprising a nitrogen atom may be borne by the silicon of the alkoxysilane group, directly or via a spacer group. The spacer group may be an atom, in particular a heteroatom, or a group of atoms.

The spacer group may be a saturated or unsaturated, cyclic or non-cyclic, linear or branched, divalent aliphatic $C_1$-$C_{18}$ hydrocarbon-based radical or a divalent aromatic $C_6$-$C_{18}$ hydrocarbon-based radical and may contain one or more aromatic radicals and/or one or more heteroatoms. The hydrocarbon-based radical can optionally be substituted.

Advantageously, the spacer group is a linear or branched, divalent aliphatic $C_1$-$C_{18}$ hydrocarbon-based radical, more preferentially a divalent aliphatic $C_1$-$C_{10}$, more preferentially still $C_3$-$C_8$, hydrocarbon-based radical, more preferentially still a linear divalent $C_3$ hydrocarbon-based radical.

The copolymer based on butadiene and on styrene may also comprise another function (i.e. a function different from those mentioned above) within the elastomer, but this is not preferable.

The copolymer based on butadiene and on styrene may also be a mixture of several copolymers based on butadiene and on styrene.

The alkoxysilane group comprising a function comprising a nitrogen atom can be represented by the formula:

$$(*-)_a Si(OR')_b R_c X$$

in which:
- *— represents the bond to an elastomer chain;
- the radical R represents a substituted or unsubstituted $C_1$-$C_{10}$, or even $C_1$-$C_8$, alkyl radical, preferably a $C_1$-$C_4$ alkyl radical, more preferentially methyl and ethyl;
- in the alkoxyl radicals of formula —OR', optionally partially or completely hydrolysed to give hydroxyl, R' represents a substituted or unsubstituted $C_1$-$C_{10}$, or even $C_1$-$C_8$, alkyl radical, preferably a $C_1$-$C_4$ alkyl radical, more preferentially methyl and ethyl;
- X represents a group comprising the nitrogen-based function;
- a is 1 or 2, b is 1 or 2, and c is 0 or 1, with the proviso that a+b+c=3.

Those skilled in the art will understand that the value of a is dependent on the positioning of the alkoxysilane group within the structure of the elastomer. When a is 1, the group is located at the chain end. When a is 2, the group is located in the middle of the chain.

Mention may be made, as function comprising a nitrogen atom, of amine functions. Primary amines, optionally protected by a protecting group, secondary amines, optionally protected by a protecting group, or tertiary amines, are particularly suitable.

Mention may thus be made, as secondary or tertiary amine function, of amines substituted by $C_1$-$C_{10}$ alkyl, preferably $C_1$-$C_4$ alkyl, radicals, more preferentially a methyl or ethyl radical, or else of cyclic amines forming a heterocycle containing a nitrogen atom and at least one carbon atom, preferably from 2 to 6 carbon atoms. For example, the methylamino-, dimethylamino-, ethylamino-, diethylamino-, propylamino-, dipropylamino-, butylamino-, dibutylamino-, pentylamino-, dipentylamino-, hexylamino-, dihexylamino- or hexamethyleneamino-groups, preferably the diethylamino- and dimethylamino-groups, are suitable. When the amine is cyclic, the following groups are also suitable: morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5.5]undecane, 3-azabicyclo[3.2.2]nonane, carbazole, bistrimethylsilylamine, pyrrolidine and hexamethyleneamine, preferably the groups pyrrolidine and hexamethyleneamine.

The amine function is preferably a tertiary amine function, preferably diethylamine or dimethylamine.

Advantageously, at least two, preferably at least three, preferably at least four, more preferably all, of the following characteristics are observed:
- the function comprising a nitrogen atom is a tertiary amine, more particularly a diethylamino- or dimethylamino-group,
- the function comprising a nitrogen atom is borne by the alkoxysilane group via a spacer group defined as an aliphatic $C_1$-$C_{10}$ hydrocarbon-based radical, more preferentially an aliphatic $C_3$-$C_8$ hydrocarbon-based radical, more preferentially still the linear $C_3$ hydrocarbon-based radical,
- the alkoxysilane group is a methoxysilane or an ethoxysilane, optionally partially or completely hydrolysed to give silanol,
- the copolymer based on butadiene and on styrene is a butadiene/styrene copolymer prepared in solution,
- the copolymer based on butadiene and on styrene is predominantly functionalized in the middle of the chain by an alkoxysilane group bonded to the two branches of the copolymer based on butadiene and on styrene via the silicon atom,
- the copolymer based on butadiene and on styrene has a glass transition temperature within a range extending from −105° C. to −70° C.

Particularly preferably, at least two, preferably at least three, preferably at least four, more preferably all, of the following characteristics are observed:
- the function comprising a nitrogen atom is a tertiary amine, more particularly a diethylamino- or dimethylamino-group,
- the function comprising a nitrogen atom is borne by the alkoxysilane group via a linear aliphatic $C_3$ hydrocarbon-based radical,
- the alkoxysilane group is methoxysilane or ethoxysilane, optionally partially or completely hydrolysed to give silanol,
- the copolymer based on butadiene and on styrene is a butadiene/styrene copolymer prepared in solution,
- the copolymer based on butadiene and on styrene is predominantly functionalized in the middle of the chain by an alkoxysilane group bonded to the two branches of the copolymer based on butadiene and on styrene via the silicon atom,
- the copolymer based on butadiene and on styrene has a glass transition temperature within a range of between −95° C. and −86° C.

The content of the copolymer based on butadiene and on styrene in the composition of the tread of the tyre according to the invention can advantageously be within a range extending from 65 to 95 phr, preferably between 66 and 90 phr.

Copolymers based on butadiene and on styrene of this type can be obtained by a process as described below.

The first step of a process for preparing the copolymer based on butadiene and on styrene is the anionic polymerization of at least one conjugated diene monomer or the polymerization of at least one conjugated diene monomer and a vinylaromatic monomer in the presence of a polymerization initiator. The monomers are as described above.

Use may be made, as polymerization initiator, of any known monofunctional anionic initiator. However, an initiator containing an alkali metal, such as lithium, is preferentially used.

Organolithium initiators comprising a carbon-lithium bond are especially suitable.

Representative compounds are aliphatic organolithium compounds, such as ethyllithium, n-butyllithium (n-BuLi), isobutyllithium, and the like.

According to the embodiment of the invention according to which the other function is directly bonded to the elastomer chain, this may be provided by the polymerization initiator. Such initiators are for example polymerization initiators comprising an amine function which result in living chains having an amine group at the non-reactive end of the chain. Mention may preferably be made, as polymerization initiators comprising an amine function, of lithium amides, the products of the reaction of an organolithium compound, preferably an alkyllithium compound, and of an acyclic or cyclic, preferably cyclic, secondary amine.

Mention may be made, as secondary amine which can be used to prepare the initiators, of dimethylamine, diethylamine, dipropylamine, di(n-butyl)amine, di(sec-butyl)amine, dipentylamine, dihexylamine, di(n-octyl)amine, di(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5.5]undecane, 3-azabicyclo[3.2.2]nonane, carbazole, bistrimethylsilylamine, pyrrolidine and hexamethyleneamine. The secondary amine, when it is cyclic, is preferably selected from pyrrolidine and hexamethyleneamine.

The alkyllithium compound is preferably ethyllithium, n-butyllithium (n-BuLi), isobutyllithium, and the like.

The polymerization is preferably carried out in the presence of an inert hydrocarbon-based solvent which may, for example, be an aliphatic or alicyclic hydrocarbon, such as pentane, hexane, heptane, isooctane, cyclohexane or methylcyclohexane, or an aromatic hydrocarbon, such as benzene, toluene or xylene.

The microstructure of the elastomer can be determined by the presence or absence of a modifying and/or randomizing agent and the amounts of modifying and/or randomizing agent employed. Preferentially, when the diene elastomer is based on a diene and a vinylaromatic, a polar agent is used during the polymerization step in amounts such that it promotes the random distribution of the vinylaromatic along the polymer chains.

Advantageously, the living diene elastomer resulting from the polymerization is subsequently functionalized by means of a functionalization agent capable of introducing an alkoxysilane group within the polymer structure in order to prepare the copolymer based on butadiene and on styrene comprising within its structure at least one alkoxysilane group bonded to the elastomer via the silicon atom, and a function comprising a nitrogen atom.

The reaction for modification of the living diene elastomer, obtained on conclusion of the first step, can take place at a temperature of between −20° C. and 100° C., by addition to the living polymer chains or vice versa of a non-polymerizable functionalization agent capable of forming an alkoxysilane group, the silicon atom being incorporated within the elastomer chain which is bearing or not bearing a function comprising a nitrogen atom. This is particularly a functionalization agent bearing functions which are reactive towards the living elastomer, each of these functions being directly bonded to the silicon atom.

The functionalization agent corresponds to the formula:

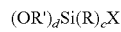

$(OR')_d Si(R)_c X$ in which:
in the alkoxyl radicals of formula —OR', which are optionally partially or completely hydrolysable, R' represents a substituted or unsubstituted $C_1$-$C_{10}$, or even $C_1$-$C_8$, alkyl radical, preferably a $C_1$-$C_4$ alkyl group, more preferentially methyl and ethyl;
R represents a substituted or unsubstituted $C_1$-$C_{10}$, or even $C_1$-$C_8$, alkyl radical, preferably a $C_1$-$C_4$ alkyl group, more preferentially methyl and ethyl;
X represents a group including a function comprising a nitrogen atom;
d is 2 or 3, c is 0 or 1, with the proviso that d+c=3.

The function comprising a nitrogen atom is as defined above.

The function comprising a nitrogen atom can be a protected or unprotected primary amine, a protected or unprotected secondary amine, or a tertiary amine. The nitrogen atom can then be substituted by two identical or different groups which can be a trialkylsilyl radical, the alkyl group having from 1 to 4 carbon atoms, or a $C_1$-$C_{10}$, preferably $C_1$-$C_4$, alkyl radical, more preferably a methyl or ethyl radical, or else the two substituents of the nitrogen form, with the latter, a heterocycle comprising a nitrogen atom and at least one carbon atom, preferably from 2 to 6 carbon atoms.

Mention may be made, for example, as functionalization agent, of (N,N-dialkylaminoalkyl)trialkoxysilanes, (N-alkylaminoalkyl)trialkoxysilanes, the secondary amine function of which is protected by a trialkylsilyl group, and (aminoalkyl)trialkoxysilanes, the primary amine function of which is protected by two trialkylsilyl groups, the divalent hydrocarbon-based group making it possible to bond the amine function to the trialkoxysilane group is the, preferentially aliphatic $C_1$-$C_{10}$, more particularly linear $C_2$ or $C_3$, spacer group as described above.

The functionalization agent may be selected from (3-N,N-dimethylaminopropyl)trimethoxysilane, (3-N,N-dimethylaminopropyl)triethoxysilane, (3-N,N-diethylaminopropyl)trimethoxysilane, (3-N,N-diethylaminopropyl)triethoxysilane, (3-N,N-dipropylaminopropyl)trimethoxysilane, (3-N,N-dipropylaminopropyl)triethoxysilane, (3-N,N-dibutylaminopropyl)trimethoxysilane, (3-N,N-dibutylaminopropyl)triethoxysilane, (3-N,N-dipentylaminopropyl)trimethoxysilane, (3-N,N-dipentylaminopropyl)triethoxysilane, (3-N,N-dihexylaminopropyl)trimethoxysilane, (3-N,N-dihexylaminopropyl)triethoxysilane, (3-hexamethyleneaminopropyl)trimethoxysilane, (3-hexamethyleneaminopropyl)triethoxysilane, (3-morpholinopropyl)trimethoxysilane, (3-morpholinopropyl)triethoxysilane, (3-piperidinopropyl)trimethoxysilane or (3-piperidinopropyl)triethoxysilane. More preferentially, the functionalization agent is (3-N,N-dimethylaminopropyl)trimethoxysilane.

The functionalization agent can be selected from (3-N,N-methyltrimethylsilylaminopropyl)trimethoxysilane, (3-N,N-methyltrimethylsilylaminopropyl)triethoxysilane, (3-N,N-ethyltrimethylsilylaminopropyl)trimethoxysilane, (3-N,N-ethyltrimethylsilylaminopropyl)triethoxysilane, (3-N,N-propyltrimethylsilylaminopropyl)trimethoxysilane or (3-N,N-propyltrimethylsilylaminopropyl)triethoxysilane. More preferentially, the functionalization agent is (3-N,N-methyltrimethylsilylaminopropyl)trimethoxysilane.

The functionalization agent can be selected from (3-N,N-bistrimethylsilylaminopropyl)trimethoxysilane and (3-N,N-bistrimethylsilylaminopropyl)triethoxysilane. More preferentially, the functionalization agent is (3-N,N-bistrimethylsilylaminopropyl)trimethoxysilane.

The functionalization agent is advantageously selected from (N,N-dialkylaminoalkyl)trialkoxysilanes; more particularly here the functionalization agent is (3-N,N-dimethylaminopropyl)trimethoxysilane.

It should be specified that it is known to those skilled in the art that, when an elastomer is modified by reaction of a functionalization agent with the living elastomer resulting from an anionic polymerization step, a mixture of modified entities of this elastomer is obtained, the composition of which depends especially on the proportion of reactive sites of the functionalization agent relative to the number of living elastomer chains. This mixture may comprise entities which are functionalized at the chain end, coupled, star-branched and/or non-functionalized.

The molar ratio of the functionalization agent to the metal of the polymerization initiator essentially depends on the type of copolymer based on butadiene and on styrene desired. Thus, with a ratio ranging from 0.40 to 0.75, or even from 0.45 to 0.65, or else from 0.45 to 0.55, the formation of coupled entities within the modified elastomer is favoured, the alkoxysilane group then being located in the middle of the chain. In the same way, with a ratio ranging from 0.15 to 0.40, or even from 0.20 to 0.35, or else from 0.30 to 0.35, star-branched (3 branches) entities are predominantly formed within the modified elastomer. With a ratio of greater than or equal to 0.75, or even of greater than 1, entities functionalized at the chain end are predominantly formed.

Advantageously, the molar ratio between the functionalization agent and the polymerization initiator varies from 0.35 to 0.65, preferentially from 0.40 to 0.60 and more preferentially still from 0.45 to 0.55.

Thus, the copolymer based on butadiene and on styrene can comprise, as predominant entity, the diene elastomer functionalized in the middle of the chain by an alkoxysilane group bonded to the two branches of the diene elastomer via the silicon atom. More particularly still, the diene elastomer functionalized in the middle of the chain by an alkoxysilane group represents 70% by weight of the copolymer based on butadiene and on styrene.

Advantageously, the alkoxysilane group advantageously comprises an alkoxy radical, optionally partially or completely hydrolysed to give hydroxyl.

Alternatively, the alkoxysilane group advantageously bears a function comprising a nitrogen atom as defined above. This function is preferably a tertiary amine function as defined above, especially diethylamino- or dimethylamino-, bonded to the silicon atom preferably via a spacer as defined above, especially a divalent linear $C_2$ or $C_3$ hydrocarbon-based radical.

When the functionalization agent bears a protected function, the synthesis process can be continued by a step of deprotection of this function. This step is carried out after the modification reaction and is well known to those skilled in the art.

The synthesis process may also comprise a step of hydrolysis of the hydrolysable alkoxyl functions by addition of an acidic, basic or neutral compound as described in the document EP 2 266 819 A1. The hydrolysable functions are then converted into hydroxyl functions.

The process for synthesizing the copolymer based on butadiene and on styrene can be continued in a way known per se by steps of recovery of the copolymer based on butadiene and on styrene.

These steps can in particular comprise a stripping step for the purpose of recovering the elastomer obtained from the previous steps. This stripping step can have the effect of hydrolysing all or some of the hydrolysable functions of the copolymer based on butadiene and on styrene. Advantageously, at least 50 mol % to 70 mol % of these functions can thus be hydrolysed.

According to the invention, the elastomeric matrix of the composition of the tread of the tyre according to the invention comprises from 5 to 75 phr of polybutadiene.

It will be understood that the term "polybutadiene" (abbreviated to "BR") can refer to one or more polybutadienes. Polybutadiene is a well known rubber which is manufactured by polymerizing the 1,3-butadiene monomer (typically a homopolymerization) in a solution polymerization process using suitable catalysts known to a person skilled in the art. Due to the two double bonds present in the butadiene monomer, the resulting polybutadiene can comprise three different forms: a cis-1,4-, a trans-1,4- and a vinyl-1,2-polybutadiene. The cis-1,4- and trans-1,4-elastomers are formed by monomers connecting end-to-end, while the vinyl-1,2-elastomer is formed by monomers connecting between the ends of the monomer.

The choice of the catalyst and the temperature of the process are known as the variables generally used to control the content of cis-1,4-bonds of the polybutadiene.

Advantageously, the polybutadiene has a content (mol %) of cis-1,4-links of greater than 90%, more preferentially of greater than 95%.

Polybutadienes of this type can be produced using a neodymium catalyst in a manner well known to a person skilled in the art, for example according to a process described in the documents JP 60/23406 A and WO 03/097708 A1. Polybutadienes of this type may also be commercially available, for example Buna® CB 22, sold by Lanxess.

Advantageously, the glass transition temperature of the polybutadiene is within a range extending from −110° C. to −80° C., preferably from −108° C. to −100° C.

Advantageously, the content of polybutadiene in the composition of the tread of the tyre according to the invention is within a range extending from 5 to 35 phr, preferably between 10 and 34 phr.

Thus, according to the invention, the elastomeric matrix of the tread of the tyre according to the invention advantageously comprises from 65 to 95 phr of copolymer based on butadiene and on styrene and from 5 to 35 phr of polybutadiene, preferably from 66 to 90 phr of copolymer based on butadiene and on styrene and from 10 to 34 phr of polybutadiene.

According to the invention, the elastomeric matrix of the composition of the tread of the tyre according to the invention comprises less than 15 phr of isoprene elastomer.

The term "isoprene elastomer" is understood to mean, in a known way, an isoprene homopolymer or copolymer, in other words a diene elastomer selected from the group consisting of natural rubber (NR), synthetic polyisoprenes (IRs), the various isoprene copolymers and the mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferentially still of greater than 98%.

The content of isoprene elastomer in the composition of the tread of the tyre according to the invention is preferentially less than 14 phr, preferably less than 10 phr, preferably less than 5 phr, preferably less than 4 phr.

Particularly advantageously, the composition of the tread of the tyre according to the invention is free of isoprene elastomer. Thus, advantageously, the total content of copolymer based on butadiene and on styrene and of polybutadiene in the composition of the tread of the tyre is 100 phr.

II-2 Reinforcing Filler

The composition of the tread of the tyre according to the invention additionally comprises a reinforcing filler, known for its abilities to reinforce a rubber composition which can be used for the manufacture of tyres.

The reinforcing filler can comprise a carbon black, a reinforcing inorganic filler or a mixture thereof.

Advantageously, the reinforcing filler predominantly comprises a reinforcing inorganic filler, preferably a silica.

The content of reinforcing inorganic filler, preferably silica, in the composition of the tread of the tyre according to the invention can be within a range extending from 80 to 200 phr, preferably from 90 to 180 phr, and preferably from 100 to 160 phr.

In addition, the content of carbon black in the composition of the tread of the tyre according to the invention can be within a range extending from 0 to 40 phr, preferably from 1 to 20 phr, and preferably from 2 to 10 phr.

The blacks which can be used in the context of the present invention can be any black conventionally used in tyres or their treads ("tyre-grade" blacks). Among the latter, mention will be made more particularly of the reinforcing carbon blacks of the 100, 200 and 300 series, or the blacks of the 500, 600 or 700 series (ASTM grades), for instance the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, applications WO 97/36724 or WO 99/16600).

Mention may be made, as examples of organic fillers other than carbon blacks, of functionalized polyvinyl organic fillers, such as described in applications WO 2006/069792, WO 2006/069793, WO 2008/003434 and WO 2008/003435.

The BET specific surface area of the carbon blacks is measured according to standard D6556-10 [multipoint (a minimum of 5 points) method—gas: nitrogen—relative pressure P/P0 range: 0.1 to 0.3].

The reinforcing inorganic fillers, preferably the silicas, which can be used in the context of the present invention can be any silica known to a person skilled in the art, in particular any precipitated or fumed silica exhibiting a BET surface area and a CTAB specific surface area which are both less than 450 m$^2$/g, preferably from 30 to 400 m$^2$/g.

The BET specific surface area of the reinforcing inorganic filler, preferably the silica, is determined in a known way by gas adsorption using the Brunauer-Emmett-Teller method described in The Journal of the American Chemical Society, Vol. 60, page 309, February 1938, more specifically according to French standard NF ISO 9277 of December 1996 (multipoint (5 point) volumetric method—gas: nitrogen—degassing: 1 hour at 160° C.—relative pressure p/p$_0$ range: 0.05 to 0.17). The CTAB specific surface area of the silica is determined according to French standard NF T 45-007 of November 1987 (method B).

Preferably, the reinforcing inorganic filler, preferably the silica, exhibits a BET specific surface area of less than 200 m$^2$/g and/or a CTAB specific surface area of less than 220 m$^2$/g, preferably a BET specific surface area within a range extending from 125 to 200 m$^2$/g and/or a CTAB specific surface area within a range extending from 140 to 170 m$^2$/g.

Mention will be made, as reinforcing inorganic fillers, preferably silicas, which can be used in the context of the present invention, for example, of the highly dispersible precipitated silicas (termed "HDSs") Ultrasil 7000 and Ultrasil 7005 from Evonik, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

In order to couple the reinforcing inorganic filler to the diene elastomer, use may be made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. The term "bifunctional" is understood to mean a compound possessing a first functional group capable of interacting with the inorganic filler and a second functional group capable of interacting with the diene elastomer. For example, a bifunctional compound of this type may comprise a first functional group comprising a silicon atom, said first functional group being able to interact with the hydroxyl groups of an inorganic filler, and a second functional group comprising a sulfur atom, said second functional group being able to interact with the diene elastomer.

Preferentially, the organosilanes are selected from the group consisting of organosilane polysulfides (symmetrical or asymmetrical), such as bis(3-triethoxysilylpropyl) tetrasulfide, abbreviated to TESPT and sold under the name Si69 by the company Evonik, or bis(triethoxysilylpropyl) disulfide, abbreviated to TESPD and sold under the name Si75 by the company Evonik, polyorganosiloxanes, mercaptosilanes, blocked mercaptosilanes such as S-(3-(triethoxysilyl) propyl) octanethioate sold by the company Momentive under the name NXT Silane. More preferentially, the organosilane is an organosilane polysulfide.

II-3 Vulcanization System

The vulcanization system preferentially comprises molecular sulfur and/or at least one sulfur-donating agent. At least one vulcanization accelerator is also preferentially present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or also known vulcanization retarders.

The sulfur is used at a preferential content of between 0.5 and 12 phr, in particular between 1 and 10 phr. The vulcanization accelerator is used at a preferential content of between 0.5 and 10 phr, more preferentially of between 0.5 and 5.0 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to MBTS), N-cyclohexyl-2-benzothiazolesulfenamide (CBS), N,N-dicyclohexyl-2-benzothiazolesulfenamide (DCBS), N-(tert-butyl)-2-benzothiazolesulfenamide (TBBS), N-(tert-butyl)-2-benzothiazolesulfenimide (TBSI), tetrabenzylthiuram disulfide (TBZTD), zinc dibenzyldithiocarbamate (ZBEC) and the mixtures of these compounds.

II-4 Plasticizing System

The rubber composition of the tread of the tyre according to the invention additionally comprises from 25 to 100 phr of at least one plasticizing resin having a glass transition temperature of greater than 20° C., known as "high Tg" (also denoted "plasticizing resin" in the present document for the sake of simplicity of wording).

II-4.1 Plasticizing Resin

The designation "resin" is reserved, in the present patent application, by definition known to a person skilled in the art, for a compound which is solid at ambient temperature (23° C.), in contrast to a liquid plasticizing compound, such as an oil.

Plasticizing resins are polymers well known to a person skilled in the art, essentially based on carbon and hydrogen but which can comprise other types of atoms, which can be used in particular as plasticizing agents or tackifying agents in polymer matrices. They are generally by nature miscible (i.e., compatible) at the contents used with the polymer compositions for which they are intended, so as to act as true diluents. They have been described, for example, in the work entitled "Hydrocarbon Resins" by R. Mildenberg, M. Zander and G. Collin (New York, V C H, 1997, ISBN 3-527-28617-9), Chapter 5 of which is devoted to their applications, notably in the tyre rubber field (5.5. "Rubber Tires and Mechanical Goods"). They may be aliphatic, cycloaliphatic, aromatic, hydrogenated aromatic, or of the aliphatic/aromatic type, that is to say based on aliphatic and/or aromatic monomers. They can be natural or synthetic and may or may not be petroleum-based (if such is the case, they are also known under the name of petroleum resins). Their Tg is preferably greater than 20° C. (generally between 30° C. and 95° C.).

In a known way, these plasticizing resins can also be described as thermoplastic resins in the sense that they soften when heated and can thus be moulded. They may also be defined by a softening point. The softening point of a plasticizing resin is generally greater by approximately 50° C. to 60° C. than its Tg value. The softening point is measured according to the standard ISO 4625 (ring and ball method). The macrostructure (Mw, Mn and PDI) is determined by size exclusion chromatography (SEC) as indicated below.

As a reminder, SEC analysis, for example, consists in separating the macromolecules in solution according to their size through columns filled with a porous gel; the molecules are separated according to their hydrodynamic volume, the bulkiest being eluted first. The sample to be analysed is simply dissolved beforehand in an appropriate solvent, tetrahydrofuran, at a concentration of 1 g/litre. The solution is then filtered through a filter with a porosity of 0.45 μm, before injection into the apparatus. The apparatus used is, for example, a Waters Alliance chromatographic line according to the following conditions:

elution solvent is tetrahydrofuran;
temperature 35° C.;
concentration 1 g/litre;
flow rate: 1 ml/min;
injected volume: 100 μl;
Moore calibration with polystyrene standards;
set of 3 "Waters" columns in series (Styragel HR4E, Styragel HR1 and Styragel HR 0.5);
detection by differential refractometer (for example WATERS 2410) which may be equipped with operating software (for example Waters Millennium).

A Moore calibration is carried out with a series of commercial polystyrene standards having a low PDI (less than 1.2), with known molar masses, covering the range of masses to be analysed. The weight-average molar mass (Mw), the number-average molar mass (Mn) and also the polydispersity index (PDI=Mw/Mn) are deduced from the data recorded (curve of weight distribution of the molar masses).

All the molar mass values indicated in the present application are thus relative to calibration curves produced with polystyrene standards.

According to a preferential embodiment of the invention, the plasticizing resin exhibits at least any one, preferably 2 or 3, more preferentially all, of the following characteristics:

a Tg of greater than 25° C. (in particular of between 30° C. and 100° C.), more preferentially of greater than 30° C. (in particular of between 30° C. and 95° C.);

a softening point of greater than 50° C. (in particular between 50° C. and 150° C.);

a number-average molar mass (Mn) of between 300 and 2000 g/mol, preferentially between 400 and 1500 g/mol;

a polydispersity index (PDI) of less than 3, preferentially less than 2 (as a reminder: PDI=Mw/Mn with Mw the weight-average molar mass).

The preferential high Tg plasticizing resins above are well known to a person skilled in the art and are commercially available, for example sold as regards:

polylimonene resins: by DRT under the name Dercolyte L120 (Mn=625 g/mol; Mw=1010 g/mol; PDI=1.6; Tg=72° C.) or by Arizona under the name Sylvagum TR7125C (Mn=630 g/mol; Mw=950 g/mol; PDI=1.5; Tg=70° C.);

$C_5$ fraction/vinylaromatic copolymer resins, in particular $C_5$ fraction/styrene or $C_5$ fraction/$C_9$ fraction copolymer resins: by Neville Chemical Company under the names Super Nevtac 78, Super Nevtac 85 and Super Nevtac 99, by Goodyear Chemicals under the name Wingtack Extra, by Kolon under the names Hikorez T1095 and Hikorez T 1100 or by Exxon under the names Escorez 2101 and Escorez 1273;

limonene/styrene copolymer resins: by DRT under the name Dercolyte TS 105 from DRT or by Arizona Chemical Company under the names ZT115LT and ZT5100.

According to the invention, the plasticizing resin having a glass transition temperature of greater than 20° C. can be selected from the group comprising or consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, α-methylstyrene homopolymer or copolymer resins and mixtures thereof. Preferably, the plasticizing resin is selected from the group comprising or consisting of (D)CPD/vinylaromatic copolymer resins, (D)CPD/terpene copolymer resins, terpene/phenol copolymer resins, (D)CPD/C$_5$ fraction copolymer resins, (D)CPD/C$_9$ fraction copolymer resins, terpene/vinylaromatic copolymer resins, terpene/phenol copolymer resins, C$_5$ fraction/vinylaromatic copolymer resins and mixtures thereof.

The term "terpene" groups together here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Suitable as vinylaromatic monomers are, for example: styrene, α-methylstyrene, ortho-methylstyrene, meta-methylstyrene, para-methylstyrene, vinyltoluene, para-(tert-butyl)styrene, methoxystyrenes, chlorostyrenes, hydroxystyrenes, vinylmesitylene, divinylbenzene, vinylnaphthalene or any vinylaromatic monomer resulting from a C$_9$ fraction (or more generally from a C$_8$ to C$_{10}$ fraction).

More particularly, mention may be made of the plasticizing resins selected from the group consisting of (D)CPD homopolymer resins, (D)CPD/styrene copolymer resins, polylimonene resins, limonene/styrene copolymer resins, limonene/D(CPD) copolymer resins, C$_5$ fraction/styrene copolymer resins, C$_5$ fraction/C$_9$ fraction copolymer resins and the mixtures of these resins.

All the above plasticizing resins are well known to a person skilled in the art and are commercially available, for example sold by DRT under the name Dercolyte as regards polylimonene resins, sold by Neville Chemical Company under the name Super Nevtac, by Kolon under the name Hikorez or by Exxon Mobil under the name Escorez as regards C$_5$ fraction/styrene resins or C$_5$ fraction/C$_9$ fraction resins, or else by Struktol under the name 40 MS or 40 NS (mixtures of aromatic and/or aliphatic resins).

Advantageously, the content of plasticizing resin having a glass transition temperature of greater than 20° C. in the composition of the tread according to the invention is between 50 and 100 phr, preferably between 55 and 90 phr.

Likewise advantageously, the total content of plasticizing resin having a glass transition temperature of greater than 20° C. is within a range extending from 25 to 100 phr, preferably between 50 and 100 phr, preferably between 55 and 90 phr.

II-4.2 Plasticizer that is Liquid at 23° C.

Although this is not necessary for the implementation of the present invention, the plasticizing system of the rubber composition of the tread of the tyre according to the invention can comprise a plasticizer liquid at 23° C., called "low Tg", that is to say which by definition has a Tg of less than −20° C., preferably of less than −40° C. According to the invention, the composition can optionally comprise from 0 to 60 phr of a plasticizer liquid at 23° C.

When a plasticizer liquid at 23° C. is used, its content in the composition of the tread according to the invention can be within a range extending from 10 to 60 phr, preferably from 15 to 40 phr. Preferably, the total content of plasticizer liquid at 23° C. is within a range extending from 0 to 60 phr, preferably from 10 to 60 phr, preferably from 15 to 40 phr.

Any plasticizer liquid at 23° C. (or extender oil), whether of aromatic or non-aromatic nature, known for its plasticizing properties with regard to diene elastomers can be used. At ambient temperature (23° C.), these plasticizers or these oils, which are more or less viscous, are liquids (that is to say, as a reminder, substances which have the ability to eventually take on the shape of their container), as opposed especially to plasticizing resins which are by nature solid at ambient temperature.

Plasticizers liquid at 23° C. selected from the group comprising or consisting of liquid diene polymers, polyolefin oils, naphthenic oils, paraffinic oils, DAE oils, MES (Medium Extracted Solvates) oils, TDAE (Treated Distillate Aromatic Extracts) oils, RAE (Residual Aromatic Extracts) oils, TRAB (Treated Residual Aromatic Extracts) oils, SRAE (Safety Residual Aromatic Extracts) oils, mineral oils, vegetable oils, ether plasticizers, ester plasticizers, phosphate plasticizers, sulfonate plasticizers and the mixtures of these plasticizers liquid at 23° C. are particularly suitable.

For example, the plasticizer liquid at 23° C. can be a petroleum oil, which is preferably non-aromatic. A liquid plasticizer is described as non-aromatic when it exhibits a content of polycyclic aromatic compounds, determined with the extract in DMSO according to the IP 346 method, of less than 3% by weight, relative to the total weight of the plasticizer.

The plasticizer liquid at 23° C. can also be a liquid polymer resulting from the polymerization of olefins or of dienes, such as polybutenes, polydienes, in particular polybutadienes, polyisoprenes (also known under the name LIRs) or copolymers of butadiene and of isoprene, or also copolymers of butadiene or of isoprene and of styrene, or the mixtures of these liquid polymers. The number-average molar mass of such liquid polymers is preferably within a range extending from 500 g/mol to 50 000 g/mol, preferably from 1000 g/mol to 10 000 g/mol. Mention may be made, by way of example, of the Ricon products from Sartomer.

When the plasticizer liquid at 23° C. is a vegetable oil, it can, for example, be an oil selected from the group comprising or consisting of linseed oil, safflower oil, soybean oil, maize oil, cottonseed oil, turnip rapeseed oil, castor oil, tung oil, pine oil, sunflower oil, palm oil, olive oil, coconut oil, peanut oil, grapeseed oil and the mixtures of these oils. The vegetable oil is preferentially rich in oleic acid, that is to say that the fatty acid (or the combined fatty acids, if several are present) from which it derives comprises oleic acid according to a mass fraction at least equal to 60%, more preferentially still according to a mass fraction at least equal to 70%. Use is advantageously made, as vegetable oil, of a sunflower oil which is such that the combined fatty acids from which it derives comprise oleic acid according to a mass fraction equal to or greater than 60%, preferably 70%, and, according to a particularly advantageous embodiment of the invention, according to a mass fraction equal to or greater than 80%.

According to another specific embodiment of the invention, the liquid plasticizer is a triester selected from the group consisting of carboxylic acid triesters, phosphoric acid triesters, sulfonic acid triesters and the mixtures of these triesters.

Mention may be made, as examples of phosphate plasticizers, of those which comprise between 12 and 30 carbon atoms, for example trioctyl phosphate. Mention may in particular be made, as examples of carboxylic acid ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may in particular be made, among the above triesters, of glycerol triesters, preferably predominantly composed (for more than 50%, more preferably for more than 80%, by weight) of an unsaturated C$_{18}$ fatty acid, that is to say selected from the group consisting of oleic acid, linoleic acid, linolenic acid and the mixtures of these acids. The glycerol triester is preferred. More preferentially, whether it is of synthetic origin or natural origin (in the case, for example, of sunflower or rapeseed vegetable oils), the fatty acid used is composed, for more than 50% by weight, more preferentially still for more than 80% by weight, of oleic acid. Such triesters (trioleates) with a high content of oleic acid are well known; they have been described, for example, in application WO 02/088238 as plasticizers in tyre treads.

When the plasticizer liquid at 23° C. is an ether plasticizer, it can, for example, be polyethylene glycol or polypropylene glycol.

Preferably, the plasticizer liquid at 23° C. is selected from the group comprising or consisting of MES oils, TDAE oils, naphthenic oils, vegetable oils and the mixtures of these plasticizers liquid at 23° C. More preferably, the plasticizer liquid at 23° C. is a vegetable oil, preferably a sunflower oil.

Likewise advantageously, the composition of the tread of the tyre according to the invention does not comprise liquid polymer.

Advantageously, the composition of the tread according to the invention comprises from 10 to 60 phr, preferably from 15 to 40 phr of vegetable oil, preferably sunflower oil.

II-3.3 Plasticizing Resin Viscous at 20° C.

Although this is not necessary for the implementation of the present invention, the plasticizing system of the rubber composition of the tread of the tyre according to the invention can comprise a plasticizing resin viscous at 20° C., called "low Tg", that is to say which by definition has a Tg within a range extending from −40° C. to −20° C. According to the invention, the composition can optionally comprise, in addition to or as replacement for all or part of the plasticizer liquid at 23° C., from 0 to 140 phr of plasticizing resin viscous at 20° C.

Preferably, the plasticizing resin viscous at 20° C. exhibits at least any one, preferably 2 or 3, preferably all, of the following characteristics:
  a Tg of between −40° C. and 0° C., more preferentially between −30° C. and 0° C. and more preferentially still between −20° C. and 0° C.;
  a number-average molecular mass (Mn) of less than 800 g/mol, preferably of less than 600 g/mol and more preferentially of less than 400 g/mol;
  a softening point within a range extending from 0° C. to 50° C., preferentially from 0° C. to 40° C., more preferentially from 10° C. to 40° C., preferably from 10° C. to 30° C.;
  a polydispersity index (PDI) of less than 3, more preferentially of less than 2 (as a reminder: PDI=Mw/Mn with Mw being the weight-average molecular mass).

The above preferential plasticizing resins viscous at 20° C. are well known to a person skilled in the art and are commercially available, for example sold as regards:
  aliphatic resin: by Cray Valley under the name Wingtack 10 (Mn=480 g/mol; Mw=595 g/mol; PDI=1.2; SP=10° C.; Tg=−28° C.);
  coumarone/indene resins: by Rutgers Chemicals under the name Novares C30 (Mn=295 g/mol; Mw=378 g/mol; PDI=1.28; SP=25° C.; Tg=−19° C.);
  $C_9$ fraction resins: by Rutgers Chemicals under the name Novares TT30 (Mn=329 g/mol; Mw=434 g/mol; PDI=1.32; SP=25° C.; Tg=−12° C.).

When a plasticizing resin viscous at 20° C. is used, its content in the composition of the tread according to the invention can be within a range extending from 20 to 120 phr, preferably from 40 to 90 phr.

Very advantageously, the total content of plasticizer liquid at 23° C. and of plasticizing resin viscous at 20° C. is within a range extending from 0 to 50 phr, preferably from 10 to 45 phr, preferably from 15 to 30 phr.

II-5 Other Possible Additives

The rubber compositions of the tread of the tyre according to the invention may optionally also comprise all or some of the usual additives customarily used in elastomer compositions for tyres, such as for example plasticizers (such as plasticizing oils and/or plasticizing resins), pigments, protective agents such as anti-ozone waxes, chemical antiozonants, antioxidants, anti-fatigue agents, reinforcing resins (as described for example in application WO 02/10269).

II-6 Preparation of the Rubber Compositions

The composition in accordance with the invention can be manufactured in appropriate mixers using two successive preparation phases well known to a person skilled in the art:
  a first phase of thermomechanical working or kneading ("non-productive" phase), which can be carried out in a single thermomechanical step during which all the necessary constituents, in particular the elastomeric matrix, the optional fillers and the optional other various additives, with the exception of the vulcanization system, are introduced into an appropriate mixer, such as a standard internal mixer (for example of 'Banbury' type). The incorporation of the optional filler into the elastomer may be performed in one or more portions while thermomechanically kneading. The non-productive phase can be carried out at high temperature, up to a maximum temperature of between 110° C. and 200° C., preferably between 130° C. and 185° C., for a period of time generally of between 2 and 10 minutes;
  a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The vulcanization system is then incorporated and the combined mixture is then mixed for a few minutes, for example between 5 and 15 min.

Such phases have been described, for example, in patent applications EP-A-0501227, EP-A-0735088, EP-A-0810258, WO 00/05300 or WO 00/05301.

The final composition thus obtained is subsequently calendered, for example in the form of a sheet or of a plaque, in particular for a laboratory characterization, or also extruded in the form of a rubber semi-finished (or profiled) element which can be used, for example, as a passenger vehicle tyre tread. These products can subsequently be used for the manufacture of tyres, according to techniques known to those skilled in the art.

The composition may be either in the raw state (before vulcanization) or in the cured state (after vulcanization), may be a semi-finished product which can be used in a tyre.

The vulcanization of the composition can be carried out in a way known to a person skilled in the art, for example at a temperature of between 130° C. and 200° C., under pressure.

II-7 Tread and Tyre

In a known way, the tread of a tyre, whether it is intended to equip a passenger vehicle or other vehicle, comprises a tread surface intended to be in contact with the ground when the tyre is rolling. The tread is provided with a tread pattern comprising in particular tread pattern elements or elementary blocks delimited by various main grooves, which are longitudinal or circumferential, transverse or even oblique, it being possible for the elementary blocks in addition to comprise various incisions or thinner strips. The grooves form channels intended to discharge water during running on wet ground and the walls of these grooves define the leading and trailing edges of the tread pattern elements, depending on the direction of the bend.

Since a tyre has a geometry which exhibits symmetry of revolution about an axis of rotation, its geometry is usually described in a meridian plane containing the axis of rotation of the tyre. For a given meridian plane, the radial, axial and circumferential directions denote the directions perpendicular to the axis of rotation of the tyre, parallel to the axis of rotation of the tyre and perpendicular to the meridian plane, respectively. By convention, the expressions "radially interior" and respectively "radially exterior" mean "closer to" and respectively "further from" the axis of rotation of the tyre. "Axially interior" and respectively "axially exterior" are understood to mean "closer to" and respectively "further from" the equatorial plane of the tyre, the equatorial plane of the tyre being the plane passing through the middle of the tread surface of the tyre and perpendicular to the axis of rotation of the tyre.

According to the invention, the tread may be composed of one and the same composition. It may also, and advantageously, comprise several portions (or layers), for example two, superimposed in the radial direction. In other words, the portions (or layers) are parallel, at least substantially, to each other, as well as to the tangential (or longitudinal) plane, this plane being defined as being orthogonal to the radial direction.

Thus, the composition in accordance with the invention can be present in the whole of the tread according to the invention.

Preferably, the tread comprises at least one radially interior portion and one radially exterior portion, the composition in accordance with the invention advantageously being present in a radially exterior portion of the tread of the tyre according to the invention. In this scenario, the radially interior portion of the tread is preferably formed of a composition different from that according to the present invention. The tread can also comprise two compositions different from one another but both in accordance with the present invention, one being present in a radially exterior portion of the tread and the other in a radially interior portion.

Preferably, the tread of the tyre according to the invention:
  has an axial width L being formed by a radial superimposition of a first portion and of a second portion radially exterior to the first portion,
  the first portion being formed by a single layer $C_1$,
  the layer $C_1$ having a radial thickness $E_1$, measured in an equatorial plane (XZ) of the tyre, which is substantially constant over at least 80% of the axial width L of the tread, and being formed of a composition different from the composition in accordance with the invention,
  the second portion being formed by a single layer $C_2$,
  the layer $C_2$ having a radial thickness $E_2$, measured in an equatorial plane (XZ) of the tyre, which is substantially constant over at least 80% of the axial width L of the tread, and being formed of a rubber composition $C_2$ in accordance with the invention.

The radially exterior portion of the tread, by definition, comes into contact with the ground when the tyre is new or when the radially exterior portion of the tread is hardly worn. On the other hand, the radially interior portion of the tread is intended to be in contact with the ground after wear of the radially exterior portion of the tread. A person skilled in the art thus readily understands that the radially outermost portion of the radially interior portion of the tread according to the invention is advantageously located above the wear indicator of the tread of the tyre.

Advantageously, the radial thickness $E_2$ of the second portion of the tyre is within a range extending from 4 to 8 mm, preferably from 4.5 to 7.5 mm.

In addition, the radial thickness $E_1$ of the first portion of the tyre is within a range extending from 1 to 5 mm, preferably from 1.5 to 4.5 mm.

The invention relates particularly to tyres intended to equip motor vehicles of passenger, SUV ("Sport Utility Vehicles") and van type, in particular motor vehicles of passenger and SUV type.

The invention relates to tyres both in the raw state (that is to say, before curing) and in the cured state (that is to say, after vulcanization).

III—EXAMPLES

III-1 Measurements and Tests Used
Dynamic Properties:

The dynamic properties G* and tan(S)Max are measured on a viscosity analyser (Metravib VA4000) according to standard ASTM D5992-96. The response of a sample of vulcanized composition (cylindrical test specimen with a thickness of 2 mm and a cross section of 79 mm$^2$), subjected to a simple alternating sinusoidal shear stress, at a frequency of 10 Hz, under standard temperature conditions (23° C.) or at 0° C. according to standard ASTM D1349-09 for the measurements of tan(δ)Max, or else at −20° C. for the measurements of G*, is recorded. A strain amplitude sweep is carried out from 0.1% to 50% (outward cycle) and then from 50% to 0.1% (return cycle). The maximum value of tan δ observed (tan(δ)max) and the difference in complex modulus (ΔG*) between the values at 0.1% and at 50% strain (Payne effect) are shown for the return cycle.

The results used are the loss factors tan(δ)Max at 0° C. and at 23° C., and also the complex dynamic shear modulus G* at −20° C.

The results for tan(δ)Max at 0° C. are expressed in base 100, the value 100 being assigned to the control. A result of greater than 100 indicates an improved performance, that is to say that the composition of the example under consideration reflects a better grip on wet ground of the tread comprising such a composition.

The results for tan(δ)Max at 23° C. and for G* at −20° C. are expressed in base 100, the value 100 being assigned to the control. A result of less than 100 indicates an improved performance, that is to say that the composition of the example under consideration respectively reflects better rolling resistance and a better grip on snow-covered ground of the tread comprising such a composition.

Abrasion Resistance

The abrasion resistance obtained by determining the volume loss by abrasion is measured according to standard NF ISO 4649 of November 2010, which consists in determining the volume loss of a sample after a displacement of 40 linear metres on standardized abrasive paper.

More particularly, the volume loss by abrasion is determined according to the indications of standard NF ISO 4649 of November 2010 (method B), using an abrasion tester in which the cylindrical test specimen is subjected to the action of a P60 grit abrasive sheet attached to the surface of a rotating drum under a contact pressure of 5 N (N=newton) and over a course of 40 m. A loss of mass of the sample is measured and the volume loss is calculated according to the density (ρ) of the material constituting the test specimen. The density (ρ) of the material constituting the test specimen is conventionally obtained on the basis of the mass fractions of each constituent of the material and their respective densities (ρ).

The results are indicated in base 100. The arbitrary value 100 being assigned to the control composition makes it possible to compare the substance volume loss of various compositions tested. The value expressed in base 100 for the composition tested is calculated according to the operation: (measured value of the substance volume loss of the control composition/measured value of the substance volume loss of the composition tested)×100. In this way, a result of greater than 100 will indicate a reduction in the volume loss and hence an improvement in the abrasion resistance, which corresponds to an improvement in the wear resistance performance. Conversely, a result of less than 100 will indicate an increase in the volume loss and hence a reduction in the abrasion resistance, which corresponds to a decrease in the wear resistance performance.

III-2 Preparation of the Compositions

In the examples which follow, the rubber compositions were produced as described in point II-6 above. In particular, the "non-productive" phase was carried out in a 0.4 litre mixer for 3.5 minutes, for a mean blade speed of 50 revolutions per minute, until a maximum dropping temperature of 160° C. was reached. The "productive" phase was carried out in an open mill at 23° C. for 5 minutes.

III-3 Tests on Rubber Compositions

The aim of the examples presented below is to compare the performance compromise between the grip on snow-covered ground, the abrasion resistance, the rolling resistance and the grip on wet ground, of six compositions in accordance with the present invention (C1 to C6) with seven control compositions (T1 to T7).

The tested formulations all contain an elastomeric matrix the nature and contents of which are presented in Table 1 below, 120 phr of "HDS"-type Zeosil 1165 MP from Rhodia, 9.6 phr of TESPT liquid silane (Si69 from Degussa) as agent for coupling silica to the elastomers, 4 phr of ASTM N234 grade carbon black from Cabot, 12 phr of Lubrirob Tod 1880 glycerol trioleate (sunflower oil with 85% by weight oleic acid) from Novance, 2 phr of antiozone wax (VARAZON 4959 from Sasol Wax), 3 phr of antioxidant (N-(1,3-dimethylbutyl)-N-phenyl-para-phenylenediamine, Santoflex 6-PPD from Flexsys), 3 phr of stearic acid (Pristerene 4931 from Uniqema), 2 phr of Perkacit DPG diphenylguanidine from Flexsys, 1.4 phr of sulfur, 1.6 phr of N-cyclohexyl-2-benzothiazolesulfenamide (Santocure CBS from Flexsys) as vulcanization accelerator, and 1.5 phr of industrial grade zinc oxide (Umicore). The properties of these formulations are also presented in Tables 1 and 2 below.

The tests presented in Table 1 have the purpose of demonstrating the effect of the elastomeric matrix, in particular the effect of the copolymer based on butadiene and on styrene having a glass transition temperature of less than −70° C., on the properties of grip on snow-covered ground, of abrasion resistance and of rolling resistance.

TABLE 1

|  | T1 | C1 | T3 | T4 | T5 | T6 | T7 |
|---|---|---|---|---|---|---|---|
| SBR1[(1)] | 100 | 75 |  |  |  |  |  |
| BR[(2)] | — | 25 | 25 | 25 | 25 | 25 | 25 |
| SBR2[(3)] |  |  | 75 |  |  |  |  |
| SBR3[(4)] |  |  |  | 75 |  |  |  |
| SBR4[(5)] |  |  |  |  | 75 |  |  |
| SBR5[(6)] |  |  |  |  |  | 75 |  |
| SBR6[(7)] |  |  |  |  |  |  | 75 |
| Plasticizing resin[(8)] | 73 | 73 | 73 | 73 | 73 | 73 | 73 |
| G* at −20° C. | 100 | 95 | 323 | 303 | 1216 | 3712 | 1113 |
| Abrasion | 100 | 108 | 102 | 77 | 73 | 47 | 7 |
| Tan(δ) max at 23° C. | 100 | 114 | 122 | 113 | 146 | 171 | 154 |

[(1)]SBR 1: SBR with 3% of styrene units and 13% of 1,2-units of the butadiene part and bearing an amino-alkoxysilane function in the middle of the elastomer chain (Tg −88° C.)
[(2)]Polybutadiene with 0.5% of 1,2-units and 97% of cis-1,4-units (Tg = −108° C.)
[(3)]SBR 2: SBR (Sn star-branched) with 15.5% of styrene units and 24% of 1,2-units of the butadiene part and bearing a silanol function at the end of the elastomer chain (Tg −65° C.)
[(4)]SBR 3: SBR with 25% of styrene units and 24% of 1,2-units of the butadiene part and bearing an amino-alkoxysilane function in the middle of the elastomer chain (Tg −65° C.)
[(5)]SBR 4: SBR (Sn star-branched) with 26% of styrene units and 24% of 1,2-units of the butadiene part and bearing a silanol function at the end of the elastomer chain (Tg −48° C.)
[(6)]SBR 5: SBR (Sn star-branched) with 25% of styrene units and 58% of 1,2-units of the butadiene part and bearing a silanol function at the end of the elastomer chain (Tg −24° C.)
[(7)]SBR 6: SBR (3-tris(di-tert-butylphenyl) phosphite star-branched) with 26.5% of styrene units and 24% of 1,2-units of the butadiene part and non-functionalized (Tg −48° C.)
[(8)]C5/C9 resin "ECR-373 resin" from the company ExxonMobil (Tg = 44° C.)

These results show that the use of a copolymer based on butadiene and on styrene in accordance with the invention as a blend with a polybutadiene makes it possible to improve the grip on snow-covered ground and the abrasion resistance without too great a detriment to the rolling resistance. However, the substitution of the copolymer based on butadiene and on styrene in accordance with the invention with a copolymer based on butadiene and on styrene not in accordance with the invention systematically results in a loss of performance in terms of abrasion resistance, grip on snow-covered ground, and potentially rolling resistance.

The tests presented in Table 2 have the purpose of demonstrating the effect of the content of copolymer based on butadiene and on styrene having a glass transition temperature of less than −70° C., and of the content of plasticizing resin, on the properties of grip on snow-covered ground, of grip on wet ground, of abrasion resistance and of rolling resistance.

TABLE 2

|  | T1 | C1 | C2 | C3 | C4 | C5 | C6 |
|---|---|---|---|---|---|---|---|
| SBR1[(1)] | 100 | 75 | 85 | 95 | 60 | 25 | 75 |
| BR[(2)] | — | 25 | 15 | 5 | 40 | 75 | 25 |
| Plasticizing resin[(8)] | 73 | 73 | 73 | 73 | 73 | 73 | 45 |
| G* at −20° C. | 100 | 95 | 96 | 93 | 82 | 63 | 91 |
| Tan(δ) max at 0° C. | 100 | 104 | 99 | 102 | 104 | 104 | 90 |
| Abrasion | 100 | 108 | 103 | 104 | 119 | 116 | 118 |
| Tan(δ) max at 23° C. | 100 | 114 | 108 | 101 | 118 | 126 | 108 |

[(1)], [(2)] and [(8)] see Table 1 above.

These results show that all of the compositions in accordance with the invention make it possible to improve the performance compromise concerning grip on snow-covered ground, abrasion resistance, rolling resistance and grip on wet ground. It is noted that the use of copolymer based on butadiene and on styrene in accordance with the invention at contents of less than 65 phr (C4 and C5) brings about an additional improvement in the grip on snow-covered ground and in the abrasion resistance to the detriment of the rolling resistance. In addition, the use of plasticizing resin having a Tg of greater than 20° C. at a content of less than 50 phr (C7) brings about an additional improvement in the grip on snow-covered ground and in the abrasion resistance to the detriment of the grip on wet ground. Compositions containing more than 65 phr of copolymer based on butadiene and on styrene in accordance with the invention and more than 50 phr of plasticizing resin having a Tg of greater than 20° C. (C1, C2 and C3) exhibit the best overall compromise between the properties of grip on snow-covered ground, abrasion resistance, rolling resistance and grip on wet ground.

The invention claimed is:

1. A tire, the tread of which comprises a rubber composition based on:
   an elastomeric matrix comprising from 25 to 95 parts by weight per hundred parts by weight of elastomer, phr, of copolymer based on butadiene and on styrene having a glass transition temperature within a range extending from −95° C. and −85° C., and from 5 to 75 phr of polybutadiene, the elastomeric matrix comprising less than 15 phr of isoprene elastomer;
   at least one reinforcing filler;
   from 25 to 100 phr of at least one plasticizing resin having a glass transition temperature of greater than 20° C.; and
   a vulcanization system.

2. The tire according to claim 1, wherein the copolymer based on butadiene and on styrene comprises within its structure at least one alkoxysilane group bonded to the elastomer by the silicon atom, and at least one function comprising a nitrogen atom.

3. The tire according to claim 2, wherein at least four of the following characteristics are observed:
   the function comprising a nitrogen atom is a tertiary amine,
   the function comprising a nitrogen atom is borne by the alkoxysilane group via a spacer group defined as an aliphatic C1-C10 hydrocarbon-based radical,
   the alkoxysilane group is a methoxysilane or an ethoxysilane, optionally partially or completely hydrolyzed to give silanol,
   the copolymer based on butadiene and on styrene is a butadiene/styrene copolymer prepared in solution,
   the copolymer based on butadiene and on styrene is more than 50% functionalized in the middle of the chain by an alkoxysilane group bonded to the two branches of the copolymer based on butadiene and on styrene via the silicon atom, and
   the copolymer based on butadiene and on styrene has a glass transition temperature within a range extending from −95° C. and −86° C.[−105° C. to −70° C.].

4. The tire according to claim 2, wherein all of the following characteristics are observed:
   the function comprising a nitrogen atom is a tertiary amine,
   the function comprising a nitrogen atom is borne by the alkoxysilane group via a linear aliphatic C3 hydrocarbon-based radical,
   the alkoxysilane group is methoxysilane or ethoxysilane, optionally partially or completely hydrolyzed to give silanol,
   the copolymer based on butadiene and on styrene is a butadiene/styrene copolymer prepared in solution,
   the copolymer based on butadiene and on styrene is more than 50% functionalized in the middle of the chain by an alkoxysilane group bonded to the two branches of the copolymer based on butadiene and on styrene via the silicon atom, and
   the copolymer based on butadiene and on styrene has a glass transition temperature of between −95° C. and −86° C.

5. The tire according to claim 1, wherein the content of copolymer based on butadiene and on styrene, in the rubber composition, is within a range extending from 65 to 95 phr, and the content of polybutadiene, in the composition, is within a range extending from 5 to 35 phr.

6. The tire according to claim 1, wherein the content of isoprene elastomer, in the rubber composition, is less than 14 phr.

7. The tire according to claim 1, wherein the total content of copolymer based on butadiene and on styrene and of polybutadiene, in the rubber composition, is 100 phr.

8. The tire according to claim 1, wherein the reinforcing filler comprises a carbon black, a reinforcing inorganic filler or a mixture thereof.

9. The tire according to claim 8, wherein the reinforcing filler comprises more than 50% by mass of a reinforcing inorganic filler.

10. The tire according to claim 8, wherein the content of reinforcing inorganic filler in the rubber composition is within a range extending from 80 to 200 phr.

11. The tire according to claim 1, wherein the content of plasticizing resin having a glass transition temperature of greater than 20° ° C., in the rubber composition, is between 50 and 100 phr.

12. The tire according to claim 1, wherein the plasticizing resin having a glass transition temperature of greater than 20° C. is selected from the group consisting of cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, α-methylstyrene homopolymer or copolymer resins and mixtures thereof.

13. The tire according to claim 1, wherein the rubber composition also comprises from 10 to 60 phr of plasticizer liquid at 23° C.

14. The tire according to claim 13, wherein the plasticizer liquid at 23° C. is selected from the group consisting of liquid diene polymers, polyolefin oils, naphthenic oils, paraffinic oils, DAE oils, MES oils, TDAE oils, RAE oils, TRAE oils, SRAE oils, mineral oils, vegetable oils, ether plasticizers, ester plasticizers, phosphate plasticizers, sulfonate plasticizers and mixtures thereof.

15. The tire according to claim 1, wherein the tread comprises at least one radially interior portion and one radially exterior portion, the rubber composition being present in a radially exterior portion of the tread.

16. A tire, the tread of which comprises a rubber composition based on:
   an elastomeric matrix comprising from 25 to 95 parts by weight per hundred parts by weight of elastomer, phr, of copolymer based on butadiene and on styrene having a glass transition temperature of less than −70° C., and from 5 to 75 phr of polybutadiene, the elastomeric matrix comprising less than 15 phr of isoprene elastomer;
   at least one reinforcing filler;
   from 25 to 100 phr of at least one plasticizing resin having a glass transition temperature of greater than 20° C.; and
   a vulcanization system,
   wherein the copolymer based on butadiene and on styrene comprises within its structure at least one alkoxysilane group bonded to the elastomer by the silicon atom, and at least one function comprising a nitrogen atom, and wherein at least four of the following characteristics are observed:
- the function comprising a nitrogen atom is a tertiary amine,
- the function comprising a nitrogen atom is borne by the alkoxysilane group via a spacer group defined as an aliphatic C1-C10 hydrocarbon-based radical,
- the alkoxysilane group is a methoxysilane or an ethoxysilane, optionally partially or completely hydrolyzed to give silanol,
- the copolymer based on butadiene and on styrene is a butadiene/styrene copolymer prepared in solution,
- the copolymer based on butadiene and on styrene is more than 50% functionalized in the middle of the chain by an alkoxysilane group bonded to the two branches of the copolymer based on butadiene and on styrene via the silicon atom, and
- the copolymer based on butadiene and on styrene has a glass transition temperature within a range extending from −105° C. to −70° C.

* * * * *